(12) United States Patent
Goldwater

(10) Patent No.: US 8,430,543 B2
(45) Date of Patent: Apr. 30, 2013

(54) PERSISTENCE OF VISION (POV) LIGHT MOUNTING SYSTEM

(76) Inventor: Dan Goldwater, Berkeley, CA (US)

(*) Notice: Subject to any disclaimer, the term of this patent is extended or adjusted under 35 U.S.C. 154(b) by 517 days.

(21) Appl. No.: 12/478,823

(22) Filed: Aug. 17, 2009

(65) Prior Publication Data

US 2011/0038169 A1     Feb. 17, 2011

(51) Int. Cl.
*B62J 6/00*     (2006.01)
(52) U.S. Cl.
USPC ........... 362/473; 362/500; 362/544; 362/552; 362/555; 362/559; 362/565
(58) Field of Classification Search ............ 362/551, 362/552, 555, 559, 565, 43, 473, 500, 543, 362/544, 253; 116/48, 49, 54
See application file for complete search history.

(56) References Cited

U.S. PATENT DOCUMENTS

| | | | |
|---|---|---|---|
| 4,135,229 A * | 1/1979 | Modurkay | 362/473 |
| 4,787,014 A * | 11/1988 | Wodder et al. | 362/473 |
| 4,796,972 A | 1/1989 | Thomas et al. | |
| 5,121,305 A | 6/1992 | Deed et al. | |
| 5,333,101 A | 7/1994 | McEvoy | |
| 5,418,697 A * | 5/1995 | Chiou | 362/473 |
| 5,584,562 A | 12/1996 | Geran | |
| 5,800,039 A | 9/1998 | Lee | |
| 5,903,224 A | 5/1999 | Reynolds | |
| 5,984,487 A | 11/1999 | McGhee | |
| 6,016,101 A | 1/2000 | Brown | |
| 6,072,386 A | 6/2000 | Yu | |
| 6,492,963 B1 * | 12/2002 | Hoch | 345/39 |
| 6,598,894 B1 | 7/2003 | Fujii et al. | |
| 7,079,042 B2 | 7/2006 | Reim | |
| 2005/0205363 A1 * | 9/2005 | Peles | 188/24.11 |

* cited by examiner

*Primary Examiner* — Danielle Allen
(74) *Attorney, Agent, or Firm* — Porter, Wright, Morris & Arthur LLP

(57) ABSTRACT

A light device for a bicycle wheel that includes a body having a rim end and a hub end, a row of at least seven independently controllable lights extending between the rim end and the hub end, electronic controls for the lights, and three mounts for securing the body to spokes of the wheel. A first mount is located near the hub end to secure the body to a first spoke. A second mount is located near the rim end to secure the body to the first spoke. A third mount is located on a side of the lights opposed to the first and second mounts and between the first and second mounts to secure the body to the second spoke. Each of the mounts includes a mounting pad located between the body and the spokes and made of a resiliently deformable material to dampen vibration and offset the body and lights from the plane of the spokes. Each of the mounts also includes an attachment clamping the mounting pad between the body and the spokes.

21 Claims, 12 Drawing Sheets

PERSISTENCE OF VISION (POV) LIGHT MOUNTING SYSTEM

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to persistence of vision (POV) light devices and, more particularly, to mounting systems for attaching POV light devices to spokes of bicycle wheels.

BACKGROUND OF THE INVENTION

It is well known to attach light devices to spokes of bicycle wheels. U.S. Pat. No. 6,598,894 to Fujii et al., the disclosure of which is expressly incorporated herein in its entirety by reference, discloses a small light device with a single light that mounts to a single spoke. U.S. Pat. No. 5,333,101 to McEvoy and U.S. Pat. No. 6,072,386 to Yu, the disclosures of which are expressly incorporated herein in their entireties by reference, each disclose a light device which is wider than it is tall. These light devices are attached to one spoke at their center and have "wings" which extend past other spokes to prevent the light device from rotating out of alignment with the wheel. U.S. Pat. No. 4,135,229 to Modurkay, U.S. Pat. No. 4,796,972 to Thomas et al., and U.S. Pat. No. 6,016,101 to Brown, the disclosures of which are expressly incorporated herein in their entireties by reference, also each disclose a light device which is wider than it is tall. These light devices however, have their two wide ends attached to two different spokes.

Persistence of vision (POV) light devices for bicycle wheels create light patterns as the wheels rotate. U.S. Pat. No. 5,903,224 to Reynolds and U.S. Pat. No. 6,072,386 to Yu, the disclosures of which are expressly incorporated herein in their entireties by reference, each disclose POV light devices. These POV light devices extend only a limited radial distance of the wheel and thus limit the size and complexity of the images capable of being displayed. It is possible to create larger more complex patterns and images as the wheels spin with light devices having many lights arranged in a radial direction along one of the spokes. See, for example, U.S. Pat. No. 6,492,963 to Hoch, the disclosure of which is expressly incorporated herein in its entirety by reference. Most of the currently available POV light devices have lights spanning over 70 mm along the spokes, and share many similarities with the Hoch design. Most of the currently available POV light devices share a common mounting system where the light device is attached near its middle to a first spoke and at its outer end (near the rim of the wheel) to a second spoke. See, for example, the mounting system sold by the Hokey Spokes Company of Gary, Ind.

While these POV light devices may adequately create desirable light patterns, their mounting systems can only be mounted to a limited number of wheel types, permit the light devices to wobble and rattle, and can be insecure at high speeds. A first inherent limitation of the common mounting system is that the mounting area at the outer end of the light device is not long enough to reach the second spoke on some wheels. In the past few years it has become a common fashion to have bicycle wheels with fewer and fewer spokes. This means the spokes are further apart. At the rim of the wheel is the greatest distance between spokes. Many of the current POV light devices use an adjustable mounting area at the outer end which fits typical older bicycle wheels, but is too short to reach the second spoke on modern low-spoke-count wheels. If these POV light devices increased the length of the adjustable mounting area to reach the second spokes, the increased length would introduce considerable mechanical flex in the long mount, and furthermore would be so long as to cause obstructions when used on the older style of wheels with more spokes. A second inherent limitation in the common mounting system is that the two attachment points position the light device in the plane of the spokes. It is also a recent fashion to have bicycle wheels with a great many spokes so that the spokes are extremely close together. On such a wheel, there may only be ½ inch between adjacent spokes at the rim, not nearly enough space to fit the current POV light devices in the plane of the spokes. Additionally, the common mounting design is prone to vibration and rattling. Bicycle wheels are subject to extreme vibration in normal use. Current POV light devices do not include any shock absorbing method and exhibit the following vibration related problems: (1) loosening of mounting hardware causing the device to become insecure; (2) vibration induced rattling which is a nuisance noise and over longer term causes wear-induced failure of the product in any number of ways; and (3) metal mounting hardware used in some POV light devices can damage spokes when vibrating against the spokes for extended periods of time. Accordingly, there is a need in the art for an improved POV light devices for mounting on bicycle wheels.

SUMMARY OF THE INVENTION

The present invention provides a light device for mounting on a bicycle wheel which overcomes at least some of the above-noted problems of the related art. According to a disclosed embodiment of the present invention, a light device for mounting to a bicycle wheel having first and second spokes comprises, in combination, a body having a rim end and a hub end, a row of at least seven independently controllable lights secured to the body and extending between the rim end and the hub end, electronic controls secured to the body and operably connected to the lights, a first mount located next to the row of lights and near the rim end of the body to secure the body to the first spoke, a second mount located next to the row of lights and near the hub end of the body to secure the body to the first spoke, and a third mount located on a side of the row of lights opposed to the first and second mounts and between the first and second mounts to secure the body to the second spoke.

According to another disclosed embodiment of the present invention, a light device for mounting to a bicycle wheel having first and second spokes comprises, in combination, a body having a rim end and a hub end, a row of at least seven independently controllable lights secured to the body and extending between the rim end and the hub end, electronic controls secured to the body and operably connected to the lights, and a plurality of mounts to secure the body to the first and second spokes. Each of the mounts includes a mounting pad located between the body and one of the first and second spokes. The mounting pads comprise a resiliently deformable material to dampen vibration and offset the body and lights from the plane of the spokes. Each of the mounts also includes an attachment for capturing the mounting pad between the body and one of the first and second spokes.

According to yet another disclosed embodiment of the present invention, a light device for mounting to a bicycle wheel having first and second spokes comprising, in combination, a body having a rim end and a hub end, a row of at least seven independently controllable lights secured to the body and extending between the rim end and the hub end, electronic controls secured to the body and operably connected to the lights, a first mount located next to the row of lights and near the rim end of the body to secure the body to the first spoke, a second mount located next to the row of lights and near the hub end of the body to secure the body to the first spoke, and a third mount located on a side of the row of lights opposed to the first and second mounts and between the first and second mounts to secure the body to the second spoke. A length of the body between the rim end and the hub end is at least 70 mm. The body is secured to the wheel only by the first, second, and third mounts. Each of the first, second, and third mounts includes a mounting pad located between the body and one of the first and second spokes. The mounting pads comprise a resiliently deformable material to dampen vibration and offset the body and lights from the plane of the spokes. Each of the first, second and third mounts includes an attachment for capturing the mounting pad between the body and one of the first and second spokes.

From the foregoing disclosure and the following more detailed description of various preferred embodiments it will be apparent to those skilled in the art that the present invention provides a significant advance in the technology and art of wheel light devices. Particularly significant in this regard is the potential the invention affords for providing a versatile light device which is stable and secure. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
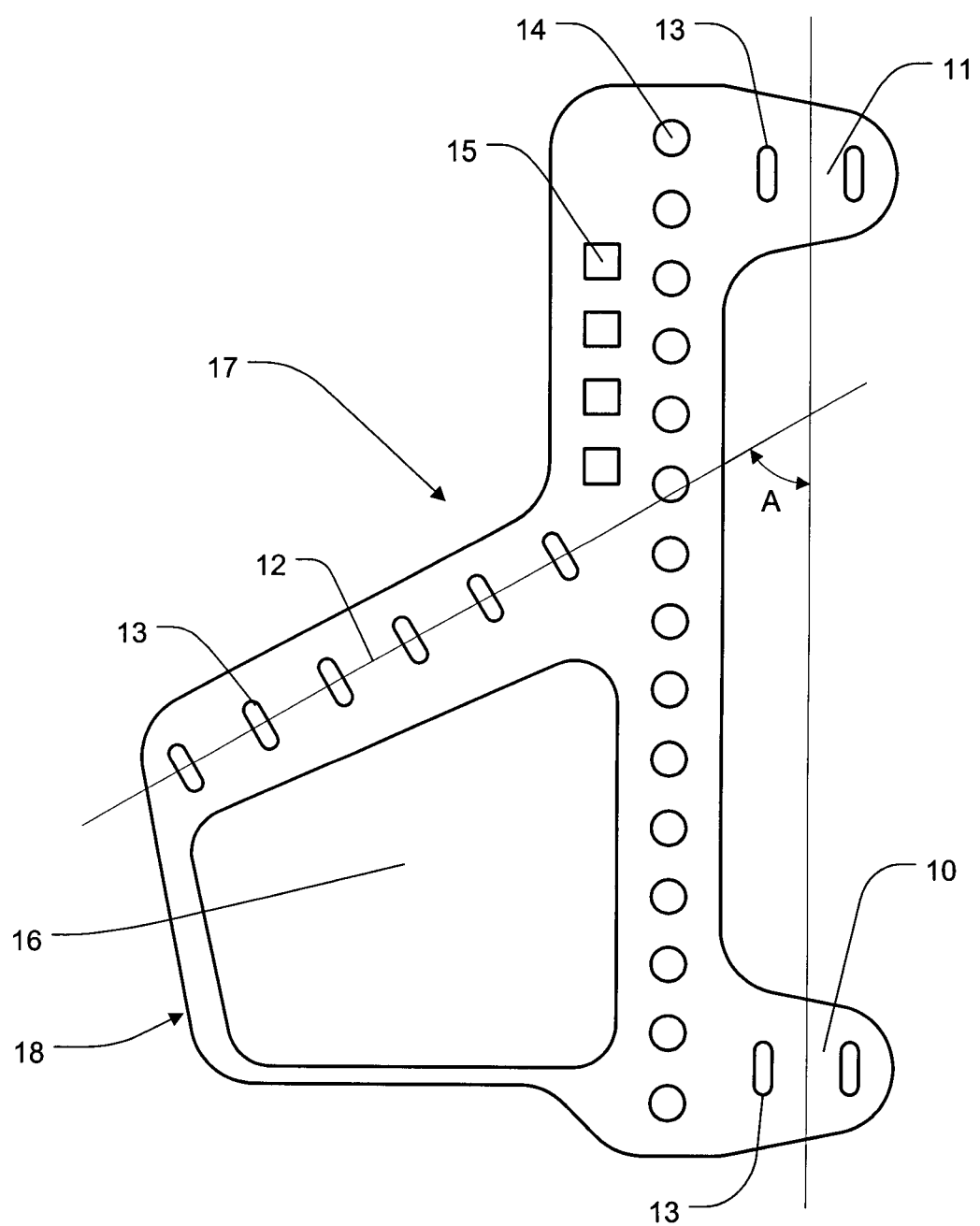
FIG. 1 is a side elevational view of a light device according to a first embodiment of the present invention.

It should be understood that the appended drawings are not necessarily to scale, presenting a somewhat simplified representation of various preferred features illustrative of the basic principles of the invention. The specific design features of light devices as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the light devices illustrated in the drawings. In general, up or upward refers to an upward direction within the plane of the paper in FIG. 1 and down or downward refers to a downward direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved light devices disclosed herein. The following detailed discussion of various alternative and preferred embodiments will illustrate the general principles of the invention with reference to a light device for use with a spoked wheel of a bicycle. Other embodiments suitable for other applications will be apparent to those skilled in the art given the benefit of this disclosure.

Referring now to the drawings, FIG. 1 shows a persistence of vision (POV) light device or unit 17 for mounting to a spoked wheel of a bicycle 19 according to a preferred embodiment of the present invention. The illustrated light device 17 includes a support body or mounting structure 18, a row or linear array of independently controllable lights 14 secured to the body 18, electronic controls or circuitry 16, 16B secured to the body 18 and operably connected to the lights 14 for controlling the lights 14, and a plurality of attachment points or mounts 10, 11, 12 to secure the body 61 to the spoked wheel.

Figure 8:
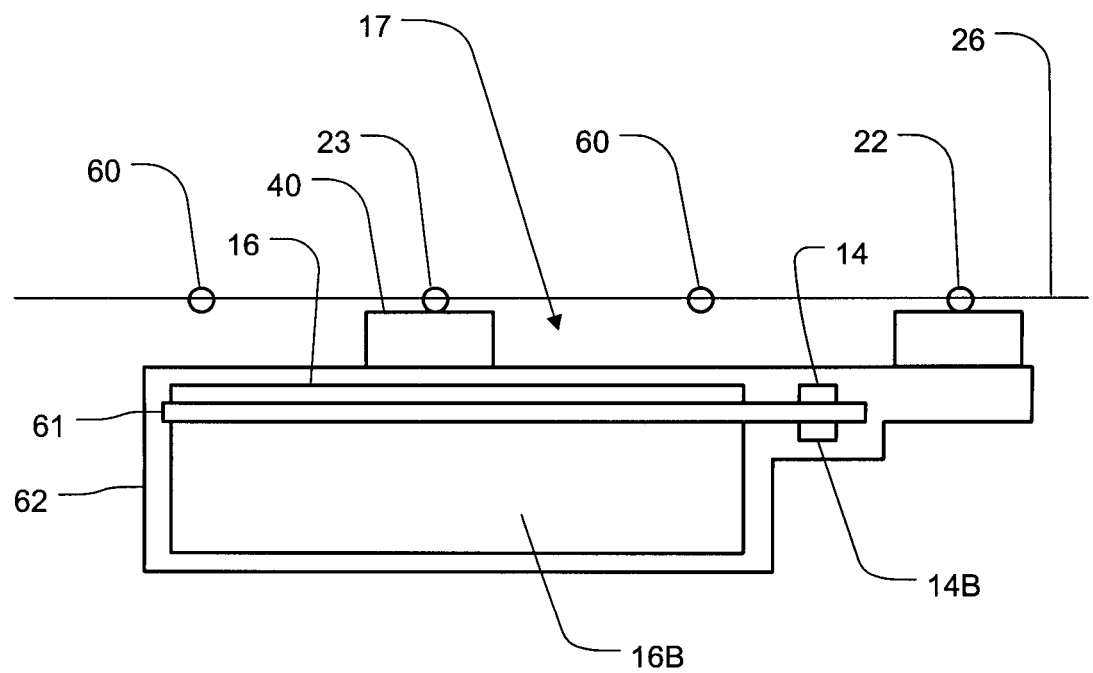
FIG. 8 is plan view of a third embodiment of the present invention, wherein components are removed for clarity.

The illustrated support body or mounting structure 18 includes a printed circuit board and structural mounting plate 61. The printed circuit board 61 may be encapsulated in a thin rubber or other suitable waterproof coating for environmental protection. The printed circuit board 61 can comprise any suitable construction such as, for example a high strength fiber composite construction. It is noted that the body 18 can alternatively have any other suitable form. For example, as shown in FIG. 8 the body 18 can include a housing or enclosure 62 within which the printed circuit board 61 is affixed. The enclosure 62 can be constructed of plastic or any other suitable material. The body 18 preferably has a length (from a hub end to a rim end) of at least 70 mm and more preferably about 160 mm allowing the body 18 to fit a common 20" size bicycle wheel, and common larger sizes of bicycle wheels such as 24", 26", 27", 29", 650 c and 700 c. The body 18 preferably has a width of about 110 mm but any other suitable width can alternatively be utilized.

The illustrated row or linear array of lights 14 extends in a radial direction of the wheel 19 from a hub end of the body 18 to a rim end of the body 18. The illustrated row of lights 14 has fifteen lights but any other suitable number of lights can be utilized. Preferably, the row of lights 14 includes at least seven lights. The lights 14 can be full color, wide angle, ultra-bright LEDS but any other suitable type of LED or any other suitable type of light can alternatively be utilized. A clear coating can be provided over the lights 14 for protection from the elements.

Figure 7:
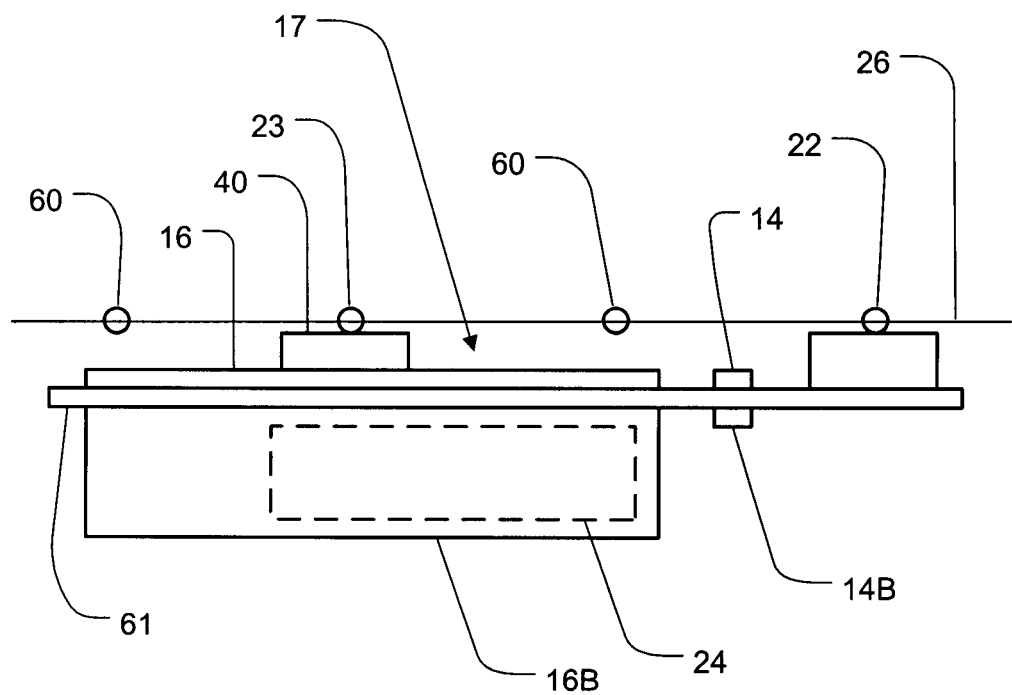
FIG. 7 is a plan view of the light device of FIG. 3, wherein components are removed for clarity.

As best shown in FIG. 7, the illustrated row of lights 14 is oriented to face perpendicularly outward from the body 18 to be visible from one lateral side of the bicycle wheel 19. The illustrated embodiment also includes another or a second row or array of lights 14B which is located on the opposite side of the body 18 directly behind the first row of lights 14 so that the second row of lights 14B is oriented in the opposite direction and is visible from the other lateral side of the bicycle wheel 19. With the two rows of lights 14, 14B oriented in this manner, the lights 14, 14B provide nearly 360 degree visibility. It is noted that a single row of lights 14 can alternatively be utilized that can be viewed from one or both sides of the bicycle wheel 19.

As best shown in FIGS. 1 and 7, the illustrated electronic controls or circuitry 16, 16B for controlling the lights 14, 14B is mounted onto and/or formed directly on the printed circuit board 61. The illustrated electronic controls 16, 16B are located on both sides of the printed circuit board 61 and near the bottom of the printed circuit board 61. The electronic controls 16, 16B are suitably connected to the lights 14, 14B to independently control each of the lights 14, 14B. The electronic controls 16, 16B can take any suitable form depending on the light type of light display desired. The electronic controls 16, 16B can be of the POV type having a graphics synthesizer system that generates constantly changing colors and patterns and/or plays stored predetermined or customized colors and patterns. The illustrated electronic controls 16, 16B includes a plurality of operator input switches or buttons 15. The illustrated row of buttons 15 is adjacent and substantially parallel to row of lights 14 but any other suitable location and/or configuration can alternatively be utilized. The illustrated electronic controls 16 include four of the buttons 15 but any other suitable quantity of buttons 15 can alternatively be utilized.

Figure 2:
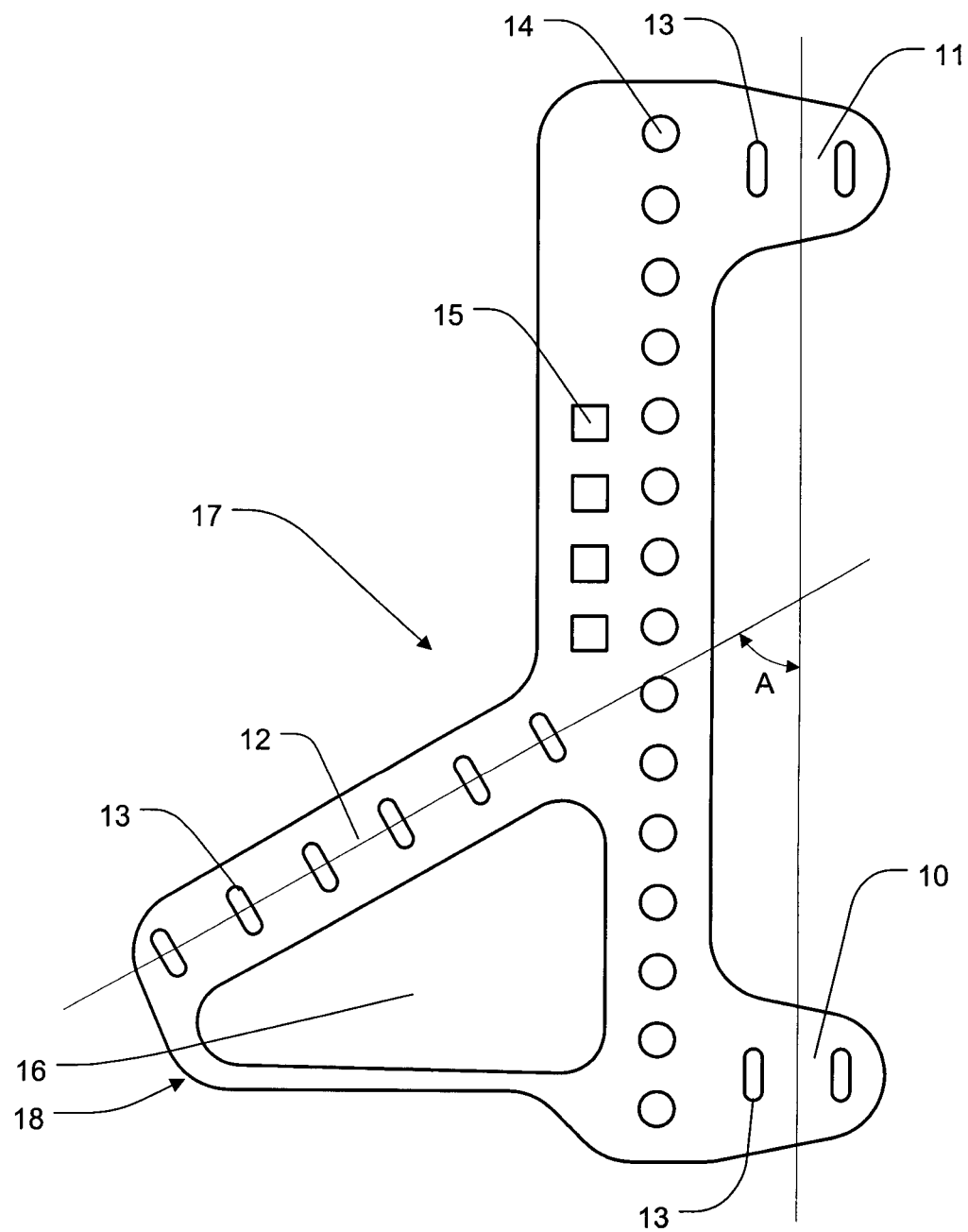
FIG. 2 is a side elevational view of a light device according to a second embodiment of the present invention.

The illustrated electronic controls 16 also include a battery compartment or holder 24 (FIG. 7) mounted to the printed circuit board 61 for holding batteries to supply power to the electronic controls 16, 16B and the lights 14, 14B. The illustrated battery compartment 24 is located on the second side of the printed circuit board 61 near the hub end of the printed circuit board 61. Mounting the batteries close to the hub 20 reduces angular momentum of the light device 17 as the wheel 19 rotates. Alternatively, the battery holder 24 can be molded into the plastic enclosure 62 when such an enclosure is provided (see FIG. 8). The battery holder 24 can be integrated with batteries either "in-line" adjacent to the row of lights 14, 14B or not in line with the lights 14, 14B. Alternatively, an external battery pack can be mounted on the bicycle wheel 19 separate from the light device 17 and connected to the electronic controls 16 of the light device 17 with a wire. As best shown in FIG. 2, the size of the area for the electrical controls 16, 16B on the printed circuit board 61 can be reduced when there is not an "on-board" battery holder 24.

The illustrated light device 17 has three attachment points or mounts 10, 11, 12 to form a three-point attachment or mounting system. As is well known to mathematicians, three points define a plane. The three-point mounting system is inherently stable against rotation in any dimension, unlike two-point mounting systems commonly used by prior art light devices for spoked wheels. The illustrated three mounts 10, 11, 12 are located near the ends/corners of the body 18 to maximize stability. The illustrated mounts 10, 11, 12 are located to accommodates the wide range of spoke configurations currently in use for bicycle wheels.

Figure 3:
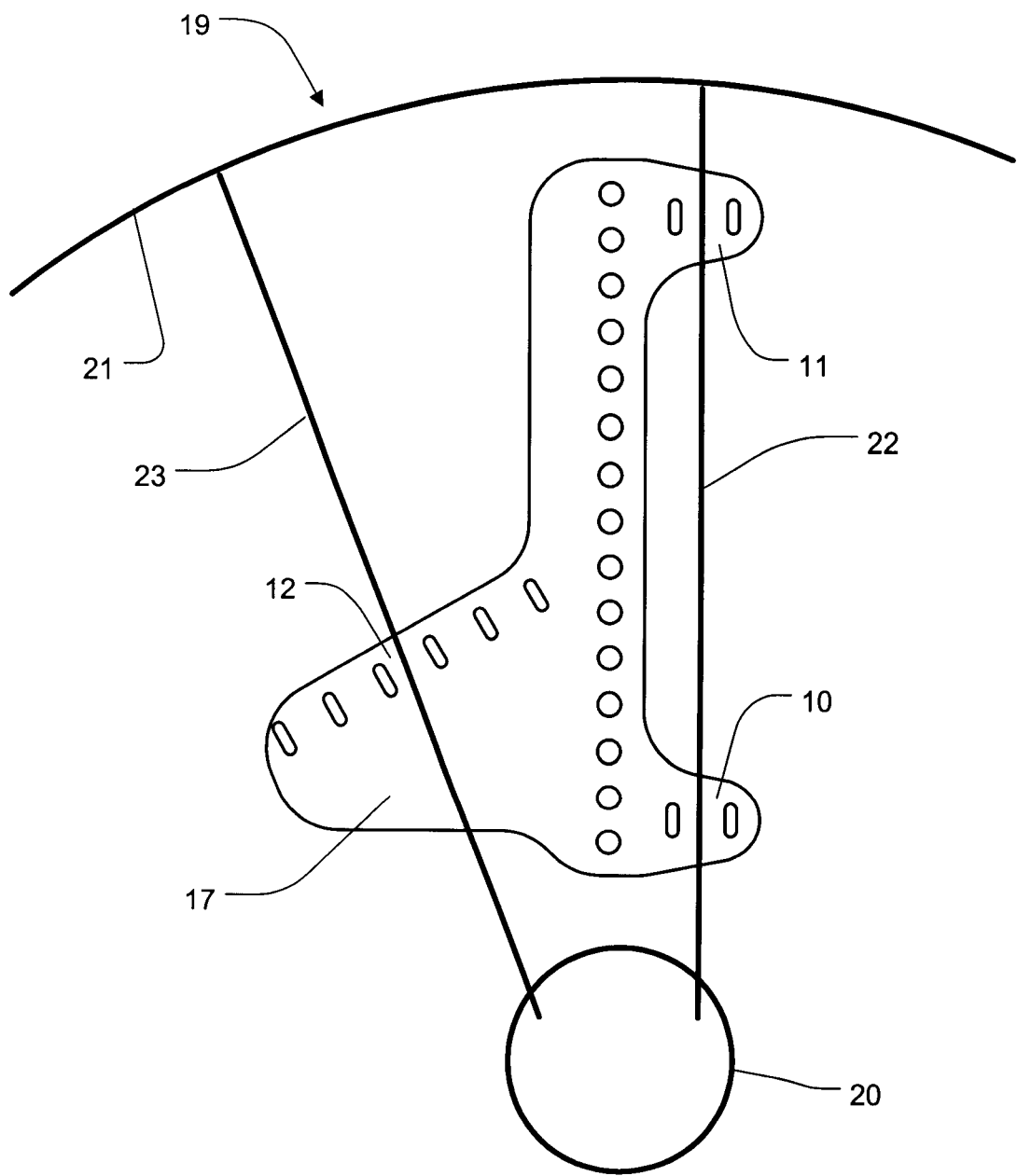
FIG. 3 is a side elevational view of the light device of FIG. 2 mounted to the spoked wheel of a bicycle, wherein components are removed for clarity.

As best shown in FIG. 3, the illustrated first and second mounts 10, 11 are located near the ends of the row of lights 14 and near the rim end and hub end of the body respectively. The first and second mounts 10, 11 are aligned with each other so that a line extending therebetween is substantially parallel to and laterally offset from the row of lights 14. Arranged in this manner, the first and second mounts 10, 11 attach to a single spoke 22 which is substantially parallel to the row of lights 14. The illustrated first mount 10 is located next to the row of lights 14 and near the hub end of the body 18 to secure the body 18 to the first spoke 22 near the hub 20 of the bicycle wheel 19. The illustrated second mount 11 is located next to the row of lights 14 on the same side of the row of lights 14 as the first mount 10 and near the rim end of the body 18 to secure the body 18 to the first spoke 22 near the rim 21 of the bicycle wheel 19.

The illustrated first and second mounts 10 and 11 include a pair of parallel and laterally spaced apart openings or slots 13 which are sized and shaped to cooperate with mounting pads 40 and attachments 25 as described in more detail hereinafter. The illustrated mounting slots 13 have a size of about 2 mm by about 6 mm for allowing use of commodity 5 mm cable ties as described in more detail hereinafter but it is noted that any other suitable size can alternatively be utilized. The illustrated distance between the mounting slots 13 is about 10 mm but it is noted that any other suitable distance can alternatively be utilized. It is noted that the first and second mounts 10, 11 can alternatively have any other suitable form.

The illustrated third mount 12 is located on a side of the row of lights 14 opposite the first and second mounts 10, 11 and between the first and second mounts 10, 11 to secure the body 18 to a second spoke 23 which is different from the first spoke 22. The illustrated third mount 12 is located closer to the hub end of the body 18 than the rim end of the body 18. Locating the third mount 12 closer to the hub 20 significantly reduces the length of the mount area needed to reach the second spoke 23 because the spacing between spokes 22, 23 is smaller at the hub 20 than at the rim 21.

The illustrated third mount 12 includes a plurality of mounting positions for securing the body 18 to the second spoke 12 in order to account for a variety of different configurations of the bicycle wheel 19. The illustrated third mount 12 includes a row of spaced apart mounting openings or slots 13 arranged in a row so the second spoke 23 can attached to whichever pair of slots 13 is closest to it. The illustrated third mount 12 has six mounting slots 13 and preferably there five to seven of the mounting slots 13 but any other suitable number of the mounting slots can alternatively be utilized. The illustrated mounting slots 13 have a spacing of about 10 mm and span a distance of about 40 mm to 60 mm but any other suitable spacing and/or distance an alternatively be utilized. The slots 13 are sized and shaped to cooperate with the attachments 25 as described in more detail hereinafter. The illustrated plurality of mounting positions extend at an acute inward angle A, that is at an angle extending toward the hub 20, relative to a line extending between the first and second mounts 10, 11. The illustrated mounting positions form an angle A of about 30 degrees but any other suitable angle A can alternatively be utilized. Orienting the row of slots 13 at an inward angle A accommodates a wider variation in spoke spacing with a relatively shorter length of the mounting area. The inward angle A combined with a suitable length of mounting positions allows the light device 17 to be securely attached to a wide range of bike wheel spoke counts and configurations. It is noted that the third mount 12 can alternatively have any other suitable form.

Figure 4:
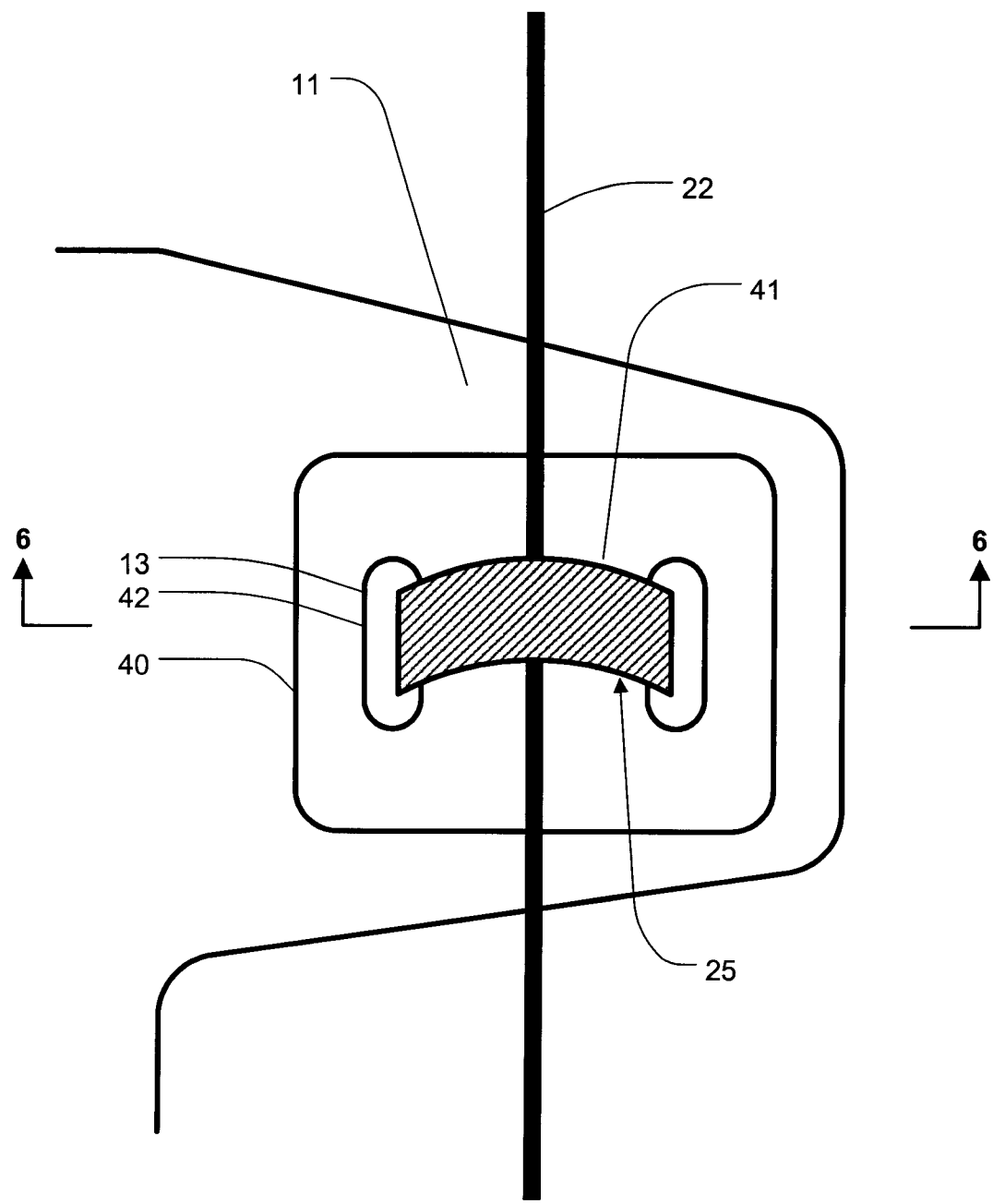
FIG. 4 is an enlarged, fragmented elevational view showing a first mounting location of the lighting device of FIG. 3, wherein a second mounting location is similar to the first mounting location.
Figure 5:
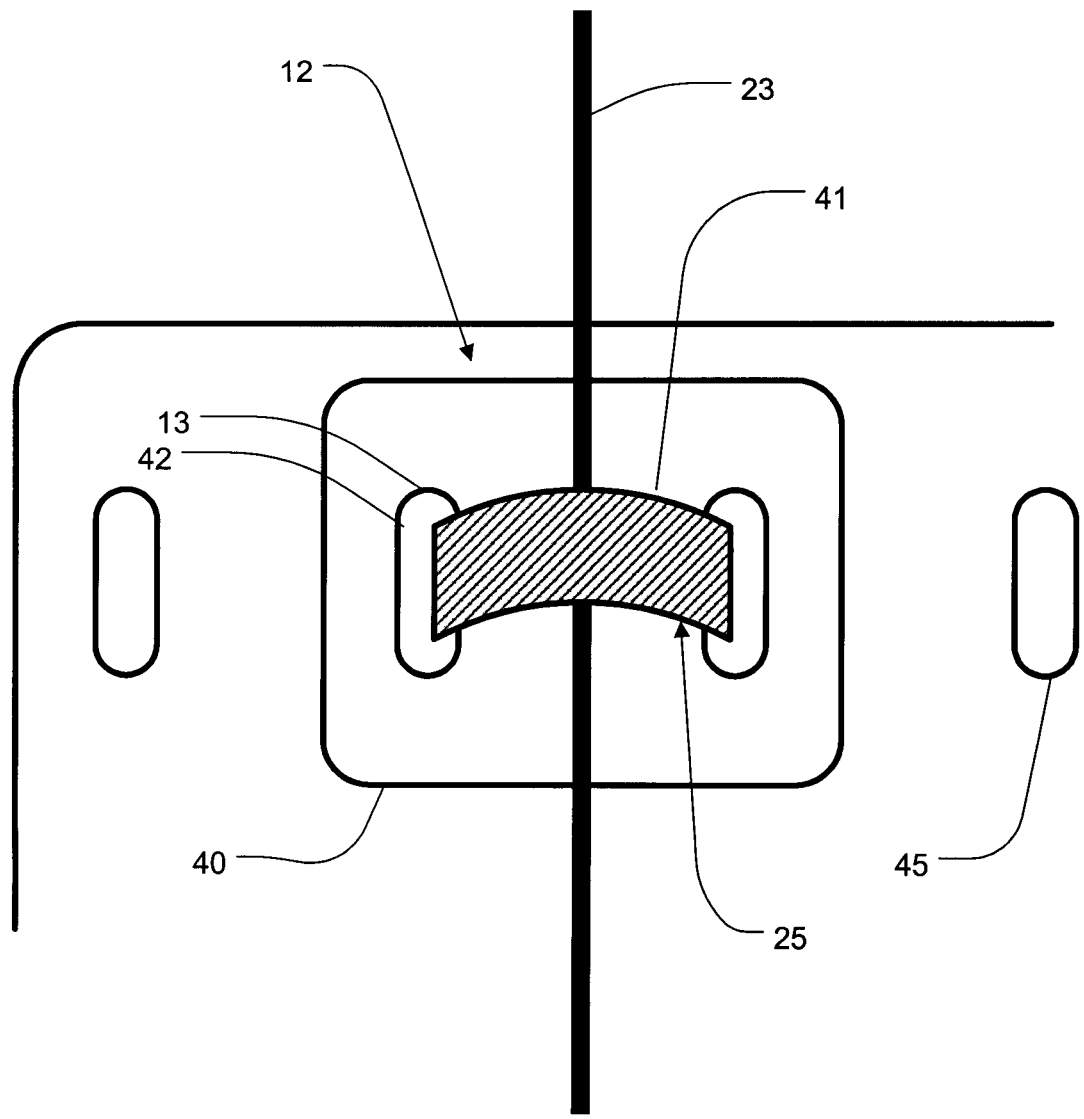
FIG. 5 is an enlarged, fragmented elevational view showing a third mounting location of the lighting device of FIG. 3.
Figure 6:
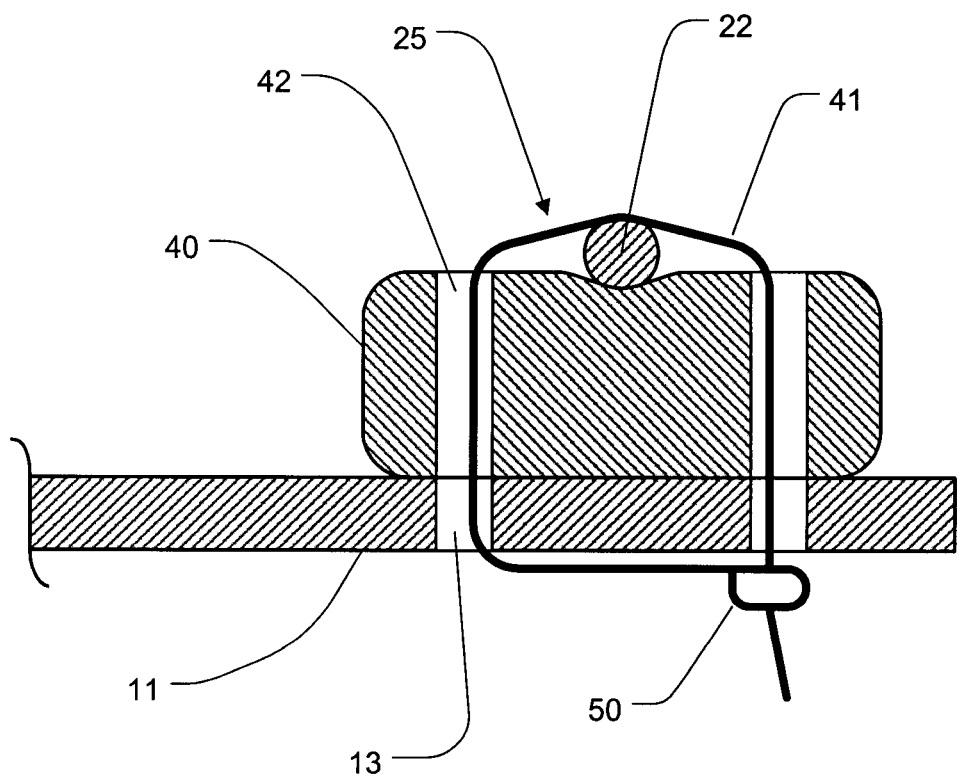
FIG. 6 is a cross-sectional view taken along line 6-6 of FIG. 4.

As best shown in FIGS. 4, 5 and 6, the illustrated mounts 10, 11, 12 each include a mounting block or pad 40 located between the body 18 and the associated one of the first and second spokes 22, 23. The illustrated mounting pads 40 are block-shaped having dimensions of about 18 mm×about 16 mm×about 5 mm but it is noted that the mounting pads 40 can alternatively have any other suitable shape and/or any other suitable dimensions. The illustrated mounting pads 40 comprise a resiliently deformable material to dampen vibration and a high friction material to reduce slippage of the light device 17 when secured to the spokes 22, 23. Preferably the mounting pads 40 comprise an elastomer such as, for example, natural rubber, synthetic rubber, and the like but any other suitable material can alternatively be utilized. It is noted that the mounting pads 40 can comprise a shore 40A rubber. It is noted that the mounting pads 40 offset or space apart the body 18, lights 14, and electronic controls 16, 16B of the light device 17 from the plane 26 of the attached spokes 22, 23 and the unattached spokes 60 (best shown in FIG. 7) which allows attachment of the light device 17 to very high spoke count wheels 19. The offset of the light device 17 from the plane of the spokes 22, 23 also allows the light device 17 to be mounted more "inside" the spokes 22, 23, 60 which reduces possibility of physical damage from a foreign object.

The illustrated mounts 10, 11, 12 also each include an attachment or fastener 25 capturing and clamping the mounting pad 40 between the body 18 and the associated one of the first and second spokes 22, 23. The illustrated attachment 25 is a locking plastic strap 41 such as a standard or releasable cable tie. Openings or slots 42, 13 are provided in the mounting pads 40 and the body 18 for the plastic strap. Plastic cable ties 41 are preferred because they do not become insecure due to vibration, and do not damage the spokes 23, 23 due to vibration. The spoke 22, 23 is captured by looping the cable tie 41 around the spoke 22, 23 and through the slots 42, 13 in the mounting pad 40 and the mount 10, 11, 12 and locking the cable tie 41 at its head 50. The cable tie 41 is tightened sufficiently that the spoke 22 is pressed into and deforms the elastic mounting pad 40 to increase the frictional surface area and frictional force between the spoke 22 and elastic mounting pad 40. In this manner, the mounting pad 40 is captured and clamped between the spoke 22, 23 and the body 18 by the cable tie 41. At the third mount 12 there are unused mounting slots 45 because only two of the slots 13 are utilized for a particular installation. It is noted that the attachment 25 can have any other suitable form such as, for example, a steel wire for improved theft resistance, or the like.

Figure 9:
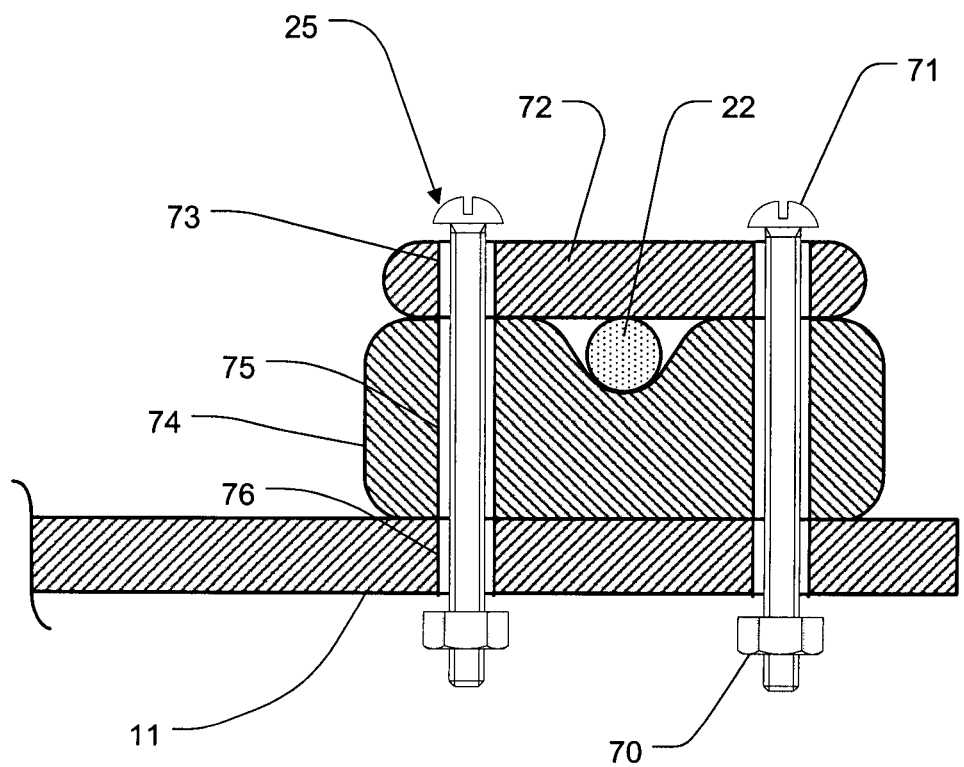
FIG. 9 a cross-sectional view similar to FIG. 6 but showing an alternative attachment.
Figure 10:
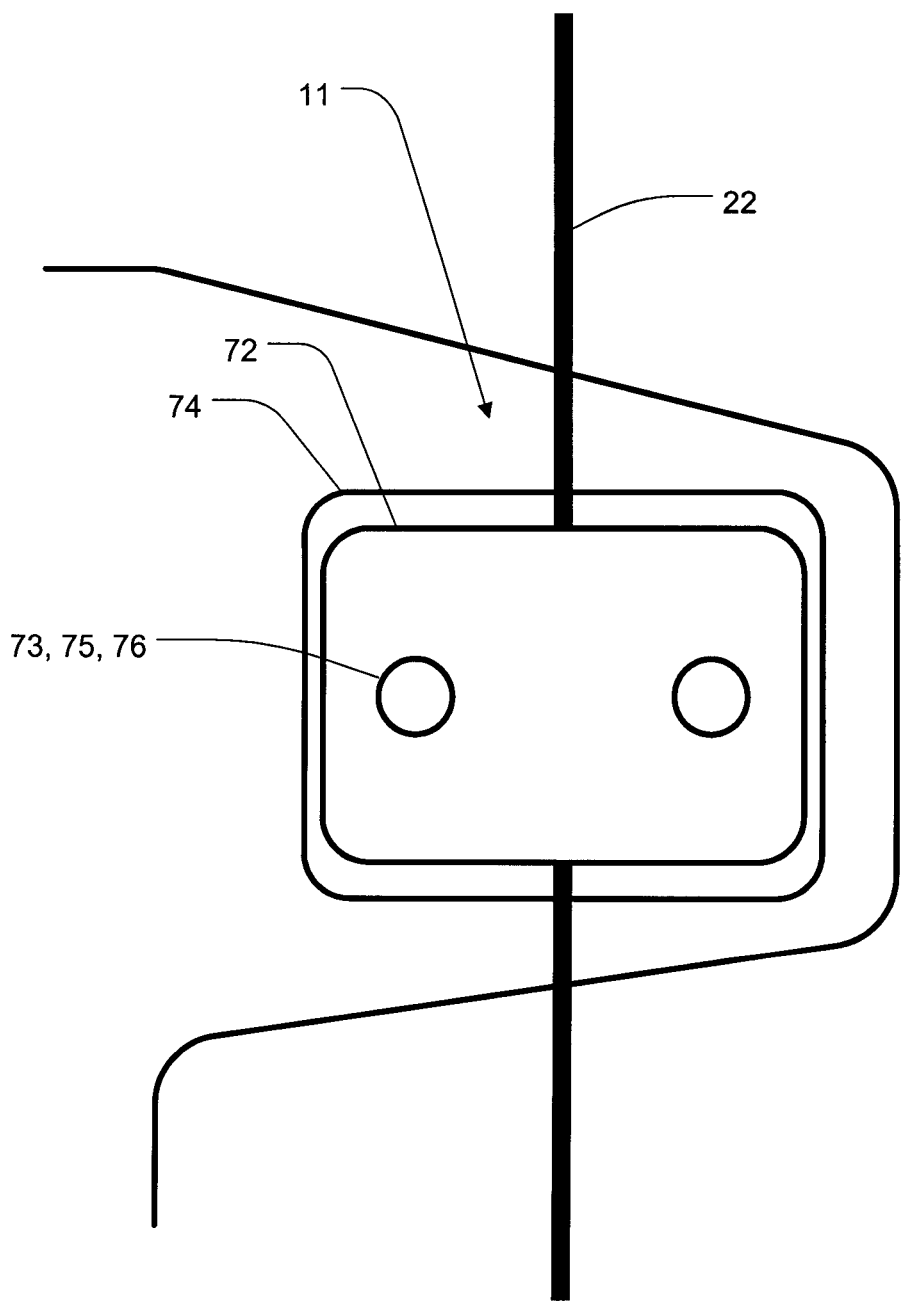
FIG. 10 an elevational view of the alternative attachment of FIG. 9, wherein components are removed for clarity.

FIGS. 9 and 10 illustrate an alternative embodiment of the light device 17, wherein the attachment 25 is in the form of a pair of screws 71, a pair of nuts 70 for cooperating with the screws 71, and a rigid, flat plate or washer 72. The screws 71 extend through a pair of openings or holes 73, 75, 76 in the plate 72, the mounting pad 74, and the body and cooperate with the nuts 70 to capture and clamp the spoke 22 between the between the plate 72 and the mounting pad 74 and the mounting pad 74 between the spoke 22 and the body 18. The screws 71 are tightened sufficiently that the spoke 22 is pressed into and deforms the elastic mounting pad 40 to increase the frictional surface area and frictional force between the spoke 22 and elastic mounting pad 40. The plate 72 is preferably formed of a plastic material but can alternatively be any other suitable material. The screws 71 and/or nuts 70 are preferably adapted to prevent loosening due to vibration.

Figure 11:
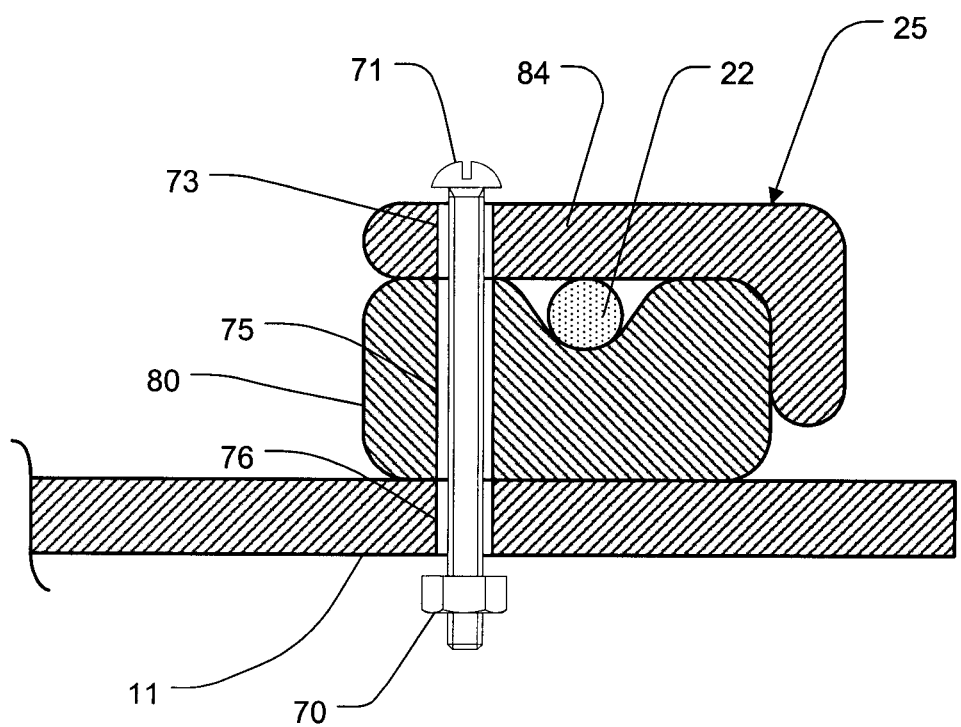
FIG. 11 a cross-sectional view similar to FIGS. 6 and 10 but showing another alternative attachment.
Figure 12:
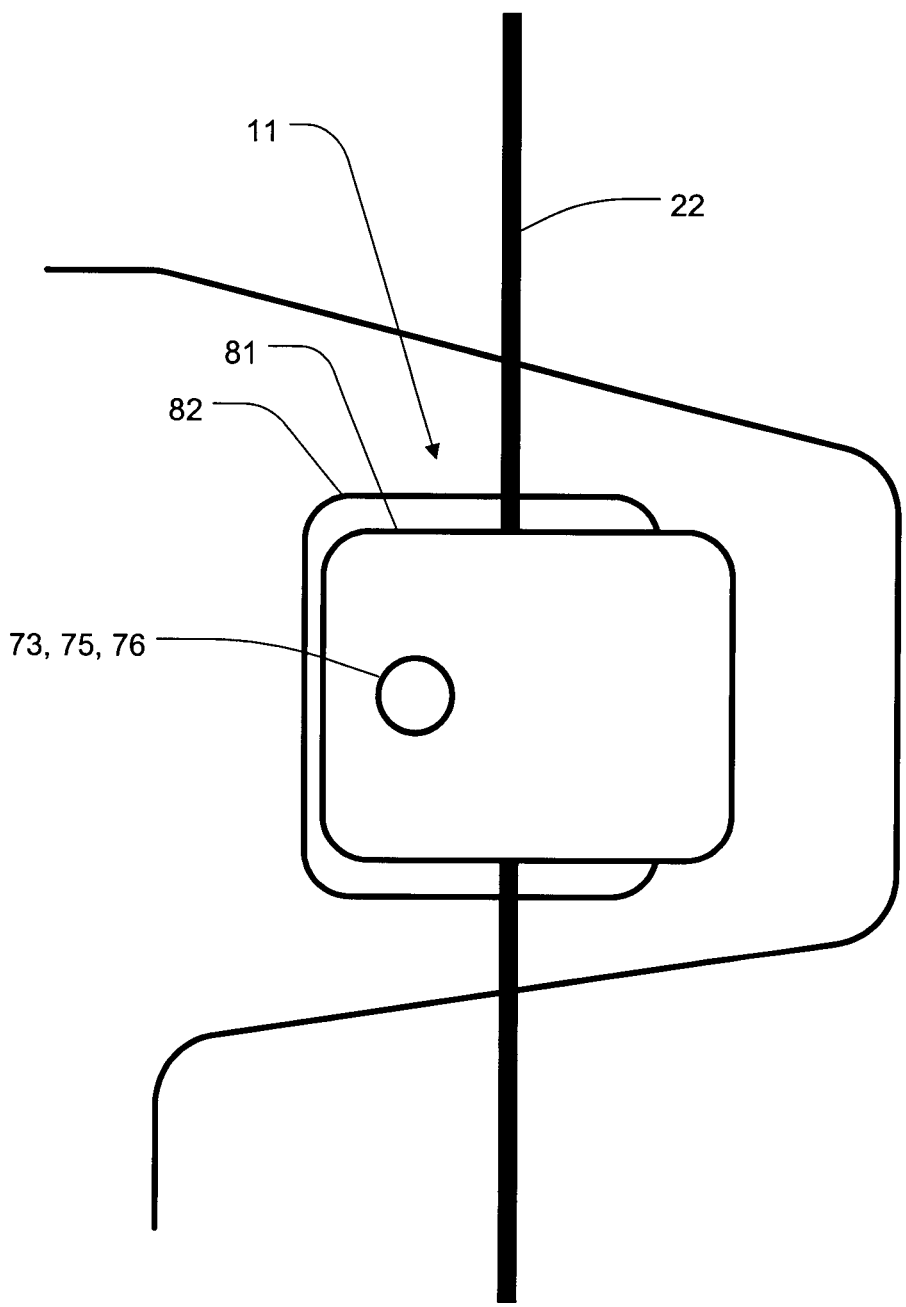
FIG. 12 an elevational view of the alternative attachment of FIG. 11, wherein components are removed for clarity.

FIGS. 11 and 12 illustrate another alternative embodiment of the light device 17, wherein the attachment 25 is in the form of a screws 71, a nut 70 for cooperating with the screw 71, and a rigid, flanged plate or washer 84. The screw 71 extends through an openings or hole 73, 75, 76 in the plate 72, the mounting pad 80, and the body and cooperate with the nut 70 to capture and clamp the spoke 22 between the between the plate 84 and the mounting pad 80 between the screw and the flange of the plate 84. Also, the mounting pad 80 is captured and clamped between the spoke 22 and the body 18. The plate 84 is preferably formed of a plastic material but can alternatively be any other suitable material. The screw 71 and/or nut 70 is preferably adapted to prevent loosening due to vibration. The screw 71 is tightened sufficiently that the spoke 22 is pressed into and deforms the elastic mounting pad 40 to increase the frictional surface area and frictional force between the spoke 22 and elastic mounting pad 40. These alternative embodiments illustrate some simple and effective ways to attach the light device 17 to the spokes 22, 23. However, a variety of other suitable attachments can be alternatively utilized.

It is believed that the illustrated light devices fit nearly all spoked bicycle wheels currently available (both very low spoke count, normal spoke count, and very high spoke count), as well as nearly all spoked bicycle wheels sized 20" and larger. It is also believed that the illustrated mounting system is ideal for long POV wheel light devices having a length over 70 mm and solves many of the problems of other known mounting systems for this type of light device. The illustrated mounting system is also effective with short/small POV light devices.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:
1. A light device for mounting to a spoked bicycle wheel having first and second spokes, said light device comprising:
  a body having a rim end and a hub end;
  a row of at least seven independently controllable lights secured to the body and extending between the rim end and the hub end;
  electronic controls secured to the body and operably connected to the lights;
  a first mount located next to the row of lights and near the hub end of the body to secure the body to the first spoke;
  a second mount located next to the row of lights and near the rim end of the body to secure the body to the first spoke;
  a third mount located on a side of the row of lights opposed to the first and second mounts and between the first and second mounts to secure the body to the second spoke; and wherein the third mount includes a plurality of alternative mounting positions for securing the body to the second spoke and the first second and third mounts are positioned so that the light device can be secured to a plurality of different sizes and types of spoked bicycle wheels.

2. A light apparatus according to claim 1, further comprising another row of at least seven independently controllable lights secured to the body and extending between the rim end and the hub end, and wherein the another row of lights is located on a side of the body opposed to the row of lights.

3. A light apparatus according to claim 1, wherein the body is secured to the wheel only by the first, second, and third mounts.

4. A light apparatus according to claim 1, wherein the first and second mounts are positioned so that the row of lights is substantially parallel to the first spoke.

5. A light apparatus according to claim 1, wherein a length of the body between the rim end and the hub end is at least 70 mm.

6. A light apparatus according to claim 1, wherein the plurality of mounting positions for securing the body to the second spoke is located closer to the hub end than the rim end.

7. A light apparatus according to claim 6, wherein the plurality of mounting positions extends for at least 30 mm.

8. A light apparatus according to claim 6, wherein the plurality of mounting positions extend at an acute angle relative to a line extending between the first and second mounts and the acute angle faces the hub end so that a distance between the plurality of mounting positions the line extending between the first and second mount increases in a direction toward the hub end.

9. A light apparatus according to claim 1, wherein the first, second and third mounts include a mounting pad located between the body and one of the first and second spokes and wherein the mounting pads comprise a resiliently deformable material to dampen vibration and offset the body and lights from the plane of the spokes.

10. A light apparatus according to claim 9, wherein the mounting pads comprise an elastomer.

11. A light apparatus according to claim 9, wherein each of the first, second, and third mounts includes an attachment for capturing the mounting pad between the body and one of the first and second spokes.

12. A light apparatus according to claim 1, wherein the plurality of mounting positions extend at an acute angle relative to a line extending between the first and second mounts and the acute angle faces the hub end so that a distance between the plurality of mounting positions the line extending between the first and second mount increases in a direction toward the hub end.

13. A light device for mounting to a bicycle wheel having first and second spokes, said light device comprising:
a body having a rim end and a hub end;
a row of at least seven independently controllable lights secured to the body and extending between the rim end and the hub end;
electronic controls secured to the body and operably connected to the lights;
a plurality of mounts to secure the body to the first and second spokes;
wherein each of the mounts includes a mounting pad located between the body and one of the first and second spokes;
wherein the mounting pads comprise a resiliently deformable material to dampen vibration and offset the body and lights from the plane of the spokes;
wherein each of the mounts includes an attachment for capturing the mounting pad between the body and one of the first and second spokes.

14. A light apparatus according to claim 13, wherein the mounting pads comprise an elastomer.

15. A light apparatus according to claim 13, wherein the plurality of mounts includes a first mount located next to the row of lights and near the hub end of the body to secure the body to the first spoke; a second mount located next to the row of lights and near the rim end of the body to secure the body to the first spoke; and a third mount located on a side of the row of lights opposed to the first and second mounts and between the first and second mounts to secure the body to the second spoke.

16. A light apparatus according to claim 15, wherein the body is secured to the wheel only by the first, second, and third mounts.

17. A light apparatus according to claim 13, further comprising another row of at least seven independently controllable lights secured to the body and extending between the rim end and the hub end, and wherein the another row of lights is located on a side of the body opposed to the row of lights.

18. A light apparatus according to claim 13, wherein a length of the body between the rim end and the hub end is at least 70 mm.

19. A light device for mounting to a bicycle wheel having first and second spokes, said light device comprising:
a body having a rim end and a hub end;
wherein a length of the body between the rim end and the hub end is at least 70 mm;
a row of at least seven independently controllable lights secured to the body and extending between the rim end and the hub end;
electronic controls secured to the body and operably connected to the lights;
a first mount located next to the row of lights and near the hub end of the body to secure the body to the first spoke;
a second mount located next to the row of lights and near the rim end of the body to secure the body to the first spoke;
a third mount located on a side of the row of lights opposed to the first and second mounts and between the first and second mounts to secure the body to the second spoke;
wherein the body is secured to the wheel only by the first, second, and third mounts;
wherein each of the first, second, and third mounts includes a mounting pad located between the body and one of the first and second spokes;
wherein the mounting pads comprise a resiliently deformable material to dampen vibration and offset the body and lights from the plane of the spokes; and
wherein each of the first, second and third mounts includes an attachment for capturing the mounting pad between the body and one of the first and second spokes.

20. The light device according to claim 19, wherein the body is secured to the wheel only by the first, second, and third mounts.

21. A light apparatus according to claim 19, further comprising another row of at least seven independently controllable lights secured to the body and extending between the rim end and the hub end, and wherein the another row of lights is located on a side of the body opposed to the row of lights.

* * * * *